United States Patent Office 3,513,106
Patented May 19, 1970

3,513,106
POROUS GLASS CATALYSTS
Ian D. Chapman, Peterborough, Ontario, Canada, and Thomas H. Elmer, Corning, N.Y., assignors to Corning Glass Works, Corning, N.Y., a corporation of New York
No Drawing. Filed Sept. 10, 1965, Ser. No. 486,512
Int. Cl. B01j 11/82
U.S. Cl. 252—432          11 Claims

ABSTRACT OF THE DISCLOSURE

Method of making a porous glass catalyst by heating a phase separating glass to a temperature sufficient to cause separation of the glass into phases at least one of which is soluble, leaching the soluble phase at a pH of 1.5–7.0 in a 0.1–3.0 molar aqueous solution of a water soluble salt of aluminum, magnesium, zirconium, or phosphorus; and also includes the addition of metal ion promoters to the leaching solution.

---

This invention relates to porous glass catalysts and in one specific aspect it relates to porous glass having at its surface a catalytically active species.

It is known to make a porous glass body by heat treating the glass to cause phase separation and then extracting the soluble phase. Such a procedure is set forth in H. P. Hood et al., U.S. Pat. No. 2,106,744, which describes in detail a method of making porous glass from an alkali borosilicate glass by heat treatment of the glass to separate it into two phases, one of which is an insoluble phase being rich in silica and the other is a soluble phase being rich in alkali and boric oxide. The soluble phase is soluble in acid and may be leached out of the insoluble phase leaving the latter as a rigid cellular structure which maintains the original shape of the initial glass and which is permeable to water.

It is equally known that synthetic alumina silica catalysts, containing from 18–30% alumina make excellent cracking catalysts. In the catalytic cracking process, organic oils of a boiling point range higher than gasoline are contacted with the catalysts at a temperature of about 500° C. which results predominantly in the cracking of carbon to carbon bonds. Cracking is also accompanied by numerous other reactions which are known to be catalyzed by strong acids, such as isomerization of paraffins and particularly of olefins formed by cracking of paraffins and naphthenes and by dealkylation of aromatics; transfer of an alkyl group from one aromatic molecule to another; some cyclization and some dehydrogenation. In one type of cracking unit, the catalyst is placed in chambers or tubes called "fixed bed units" and the reactions are performed without removing the catalysts. However, it has been found advantageous to circulate the catalyst through a series of vessels and most cracking today is done in units in which the catalyst circulates from the reactor to the stripper, then to the regenerator and finally returns to the reactor. The catalyst is used in the form of pellets or beads for the one type of units or as ground powder or microspheres for the so called "fluid bed units."

Attempts to produce an alumina-silica gel on porous glass by post-impregnating the leached glass with a water soluble aluminum salt solution has not produced an effective catalyst. This may be explained by the fact that neither silica, nor alumina, nor a mixture of the dry oxides is an active catalyst for the cracking of hydrocarbons, as reported by M. W. Tamele, et al., Proc. Third World Pet. Congr., Sect. IV, p. 98, Leiden, E. J. Brill Co., 1951.

Quite surprisingly, we have discovered a mixed oxide-porous glass catalyst in which an amorphous mixture of oxides is located at the surface of a leached glass body and chemically bonded to the glass body. We have also discovered an improved mixed oxide-porous glass catalyst in which an amorphous mixture of alumina and silica contains a catalytically reactive metal ion promoter. The active portion of the catalyst is chemically bonded to the glass body and is not readily removed by solvents.

It is therefore an object of the present invention to provide a reactive catalyst on a porous glass body.

It is another object of the present invention to provide a promoter for a reactive catalyst on a porous glass body.

In accordance with the present invention we have discovered a method of making a porous glass catalyst by heating a phase separating glass to a temperature sufficient to cause separation of the glass into two phases, one of which is soluble in a leaching solution, and leaching and removing the soluble phase with the leaching solution containing a catalytically active species that becomes chemically bound to the surface of the porous glass.

One type of catalytic active species of the present invention is the mixed oxide catalyst. This is an amorphous mixture of oxides located at the surface of the leached glass body and chemically bonded to the glass body. Primarily these catalysts are useful for cracking of hydrocarbons, for isomerization reactions and for alkylation and dealkylation of aromatic hydrocarbons. Another type of catalytically active species of the present invention are mixed oxide catalysts in combination with a metal ion promoter. These catalysts are silica and alumina gel combined with a metal ion of Group VIII of the Periodic Table including iron, cobalt, nickel, palladium and platinum and are located at the surface of the leach glass body and chemically bonded thereto. Typically, such catalysts can be used for hydrocracking, polymerization and hydrogenation reactions. The catalytically active species are introduced onto the glass body during the leaching process and can originate either solely from the leaching solution or partially from the leaching solution and partially by being present in small amounts in the base phase separating glass.

The phase separating glass useful in the present invention is a glass which with or without prior heat treatment will leach so as to leave a porous skeletal structure of sufficiently high surface area. By "phase separating glass" we mean any glass which is capable of forming into two separate phases one of which is soluble in the leaching solution. Such glasses are well known and are described in the Hood patent cited above. An example of a base glass in the sodium borosilicate system contains: silica 65% by weight, boric oxide 25% be weight and sodium oxide 10% by weight. A preferred base glass which we have found to be particularly desirable in the present invention contains the following formulation:

| Ingredient: | Percent by weight |
|---|---|
| $SiO_2$ | 62.7 |
| $Na_2O$ | 6.6 |
| $B_2O_3$ | 26.9 |
| $Al_2O_3$ | 3.5 |
| $As_2O_3$ | 0.3 |

Such glass can typically be used in making 96% silica glass.

The reactive catalysts of the present invention is prepared from a suitable base glass described above which is optionally subjected to an initial heat treatment to effect phase separation. In some glasses heat treating is necessary or preferable, whereas in other glasses this is not necessary. The glass is then leached in a suitable solution incorporating the catalytic reactive material and finally the glass can be activated and used as a catalyst.

The glass may be initial subjected to a heat treatment which will depend upon the composition chosen, but this step is not always required. The heat treatment of the glass will most often be important in the case where one is incorporating part of the reactive catalyst in the glass structure. Specifically, heat treatment can affect the location of the alumina, for example, in a sodium borosilicate glass containing about 4% alumina. In this type of glass there are two phases present upon heat treatment, one is principally silica and the other is alkali and boric oxide. The alumina may be present in either phase and the length of time of heat treatment and the temperature of heat treatment may alter the distribution of alumina in one or the other phase. A glass in which the alumina is principally present in the silica phase will not be as catalytically active as one where the alumina is more available to the leaching solution, that is, in the leached phase. The heat treatment of the glass is generally at a temperature of about 525° C. for a few days to a temperature of about 600° C. for a few hours. In the present invention using the preferred glass, we prefer to use a temperature of about 580° C. for a period of about 3 hours.

The leaching step primarily serves two functions: (1) to remove the soluble phase from the phase separating glass and form a high surface area porous body; and (2) to chemically bond the gel or the gel in combination with the metal ion promoter to the porous glass body. This step requires a mild leaching agent; strong leaching agents such as any of the mineral acids and in particular hydrofluoric acid should be avoided since these dissolve the alumina in the glass and can destroy the porous silica structure. The leaching agents generally are aqueous solutions of water soluble salts containing aluminum, magnesium, zirconium, and phosphate ions. These salts should be present in an amount of 0.1–3.0 molar concentration and preferably in the lower range of 0.1–0.3 molar concentration. The aqueous leaching solution should have a pH of about 1.5–7.0, i.e., from acidic to about neutral; alkaline solutions should not be used since these do not remove some of the constituents in the soluble phase. Generally, as the concentration of the salts in the leaching solution increase, the pH decreases and the rate of leaching correspondingly increases.

We have found that when metal ion promoters are used, the most effective water soluble salt solution are those containing aluminum salts. In this instance, the aluminum salts should be present in the amounts set forth above which is from 0.1–3.0 molar concentration and the catalytically active metal ion promoter should be present in the range of 0.1–1.0 molar concentration. The preferred amount of metal ion promoter for use in the present invention is in the range of 0.1–0.3 molar concentration.

The temperature of the leaching solution should be sufficient to leach the base glass within a reasonable time. The leaching bath is preferably at a temperature of approximately 95° C. and up to about the boiling point of the solution. However, leaching can be performed at lower temperatures down to about room temperature and at temperatures and pressures obtainable in an autoclave. The size and shape of the material being leached is a function of time, temperature, concentration, pH and other factors. The base glass should be left in the treating solution for a time sufficient to substantially remove the soluble phase, usually between about 0.5–8 hours, which depends somewhat on the shape and size of the material being leached.

In the table below are given the principal types of catalytic reactive oxide gels formed on the porous glass of the present invention and examples of the aqueous solution of salts used as leaching agents to produce the particular oxide gel. The base glasses that can be used are those described hereinabove and in particular the preferred base glass composition. In the alumina-silica gel and the alumina-phosphate gel there should be from 1–5% of alumina present in the base glass; in the silica-zirconia gel there should be from 1–5% zirconia present in the base glass. The final porous glass catalyst typically contains a 96% silica porous glass body and at least a sufficient amount of the catalytically active oxide gel to cover the surface area of the glass body.

TABLE I

Mixed oxide gel—Porous glass

| Active oxides gel: | Leaching agents |
| --- | --- |
| (1) Alumina-silica | Water soluble aluminum salts, e.g. $Al(NO_3)_3 \cdot 9H_2O$. |
| (2) Alumina-phosphate | Water soluble phosphate salts, e.g. $(NH_4)_3 PO_4 \cdot 3H_2O$. |
| (3) Silica-magnesia | Water soluble magnesium salts, e.g. $Mg(NO_3)_3 \cdot 6H_2O$. |
| (4) Silica-zirconia | Water soluble zirconium salt, e.g. $Zr(SO_4)_2 \cdot 4H_2O$. |

Table II is a preferred embodiment of the present invention in which the alumina-silica gel is combined with a metal ion promotor and the various salt solutions for making the active species are shown. Generally, the metal ion promotor is present in an amount of 0.1–1% by weight of the metal as the oxide and typically the amount present is between 0.4–0.6% by weight.

TABLE II

Mixed oxide gel with metal ion promoter

| Active species: | Leaching agent |
| --- | --- |
| Alumina-silica gel in combination with: | Water soluble salts of aluminum, e.g. $Al(NO_3)_3 \cdot 9H_2O$ plus a water soluble salt of metal ion, e.g. |
| (a) $Fe^{+++}$ | $Fe(NO_3)_3 \cdot 9H_2O$. |
| (b) $Co^{++}$ | $Co(NO_3)_2 \cdot 6H_2O$. |
| (c) $Ni^{++}$ | $Ni(NO_3)_2 \cdot 6H_2O$. |
| (d) $Ag^+$ | $AgNO_3$. |
| (e) $Pd^{++}$ | $PdCl_2 \cdot 2H_2O$. |
| (f) $Pt^{++++}$ | $H_2PtCl_6 \cdot 6H_2O$. |

One of the primary and important features of the present invention is the fact that the porous glass has a very high surface area for making contact with a particular material being subjected to the catalytic reaction. It is for example known that the greater the surface area of the catalyst, the better the catalyst is able to make contact with the material being reacted. Usually the surface area of the catalyst of the present invention is about 50–600 sq. meters per gram. This large surface area is obtained by leaching of the phase separable glass to produce pores or open cellular portions in the glass. Generally after leaching the pore size in the glass will range from about 17–250 angstroms.

The catalyst is usually used in the form of particles or granules which are ground from the original glass composition. The grinding may be performed before or after the leaching step. Finely divided powders of the porous catalyst can be used in the fluid bed reactor which behave like a liquid phase. For this type of reactor, the glass is ground into a powder to pass through a 200 mesh U.S. sieve size. The catalytic product is used in a conventional manner such as those described hereinabove in using alumina-silica catalysts. In the case of a cracking reaction, the glass is finely powdered and can be used either in a "fixed bed type reactor" or a "fluid bed type reactor."

Our invention is further illustrated by the following examples:

EXAMPLE I

A base glass composition, in the form of half inch tubing, composed in weight percent on the oxide basis of the following ingredients 63 percent silica, 27 percent boric oxide, 7 percent of sodium oxide, and 3 percent aluminum oxide was heated at a temperature of 580° C. for three hours. After phase separation, the glass was leached at a temperature of 95° C. for three days in a 1.5 molar triammonium phosphate solution, washed at the same temperature for one day in a fresh 1.5 molar triammonium phosphate solution and finally rinsed in distilled water for three hours.

The resultant porous glass had a surface area of 42 sq. meters per gram and was composed in weight percent of 96.5 percent silica, 3.1 percent aluminum oxide and 0.4 percent phosphoric oxide. The porous glass was then ground to pass through 200 mesh (U.S. sieve size), activated at a temperature of 475° C. for 16 hours and tested for its catalytic cracking properties. The active part of this catalyst is an alumina-phosphate gel, formed during leaching and attached to the surface of the silica porous glass body.

The catalytic cracking reactor consisted of a 96% silica glass tube having a diameter of 2 cm. and a length of 120 cm. which was mounted vertically in a furnace capable of heating the tube to 500° C. The tube was filled at a place about ⅔ from the bottom with 10 cc. of the catalyst to be tested, supported by glass wool and the remainder of the tube was packed with 4–8 mesh 96% silica chips. A thermocouple was immersed in the catalyst bed for measuring the reaction temperature. Then the reactor was heated to a temperature of 400° C. while a stream of dry nitrogen was passed over the catalyst bed. Thereafter cumene at the rate of 1.0 ml./min. was passed into the tube in a stream of hot nitrogen gas which caused the cumene to become vaporized prior to contacting the catalyst bed and to heat the cumene to essentially the temperature of the catalyst bed.

The effluents, consisting of unconverted cumene, benzene and propylene, were swept through the reactor tube and the gases were cooled in a collector immersed in an ice bath. This condensed the cumene and the benzene but allowed the propylene to escape. The mixture was analyzed by gas chromatography and from previous calibration the percent of cumene in the mixture was calculated.

It was found that the porous glass catalyst of this example converted 15 percent per pass of the cumene to benzene and propylene.

EXAMPLE II

Following the procedure and using the apparatus of Example 1, an active alumina-silica gel on a porous glass body was prepared from a base glass composed in weight percent of 57 percent silica, 3 percent alumina, and 40 percent sodium oxide. The glass was crushed to pass through 200 mesh and then leached for one hour in an 1.0 molar aluminum nitrate solution at a temperature of 95° C. while being stirred. The glass was then washed with stirring for one half hour in water at 95° C.

The porous glass catalyst product had a surface area of 225 sq. meters per gram and was composed of 89.4 percent by weight of silica and 10.6 percent by weight of alumina. The catalytic activity of the product was determined by testing 10 cc. of the catalyst activated at 450° C. for 16 hours and then placing it in the reactor which was heated to 400° C. It was found that the catalyst was able to crack 31 percent per pass of the cumene at a flow rate of one ml./min.

EXAMPLE III

Following the procedure and using the apparatus of Example 1, an active alumina-silica gel combined with a metal ion promoter was formed on a porous glass body from a base glass composed in weight percent of 63 percent silica, 27 percent boric oxide, 7 percent sodium oxide and 3 percent aluminum oxide. The base glass was initially heated to a temperature of 580° C. for three hours and then crushed to pass through a 200 mesh sieve.

Twenty grams of the crushed glass were placed in an 800 ml. solution containing 0.2 molar concentration of aluminum nitrate and 0.2 molar concentration of nickel nitrate. The glass was leached for one hour while being agitated and then washed with water for 10 minutes. The porous glass had a surface area of 304 sq. meters/gm. and was composed of 2.5 percent by weight aluminum oxide, 0.6 percent by weight nickel oxide and 96.6 percent by weight silica. This catalyst is effective for hydrogenation of olefins.

We claim:

1. A method of making a porous glass catalyst comprising heating a phase separating alkali-borosilicate glass to a temperature sufficient to separate the glass into two phases only one of which is soluble in an aqueous solution and leaching the soluble phase at a pH of 1.5–7.0 in a 0.1–3.0 molar aqueous solution of a water soluble salt containing a member selected from the group consisting of aluminum, magnesium, zirconium and phosphorus.

2. The method according to claim 1 wherein the leaching step is at a temperature of at least about 95° C.

3. The method of claim 1 wherein said salt is a water soluble aluminum salt.

4. The method of claim 1 wherein said salt is a water soluble magnesium salt.

5. The method of claim 1 wherein said salt is a water soluble zirconium salt.

6. The method of claim 1 wherein said salt is a water soluble phosphate salt.

7. A method of making a porous glass catalyst comprising heating a base glass composition consisting essentially in weight percent on the oxide basis of about 63 percent silica, 7 percent sodium oxide, 27 percent boric oxide and 3 percent aluminum oxide to a temperature of 525–600° C. to separate the glass into a soluble and an insoluble phase, and leaching and removing the soluble phase in a 0.1–3.0 molar aqueous solution of aluminum nitrate to form an alumina-silica gel on the insoluble phase.

8. A method of making a porous glass catalyst comprising heating a phase separating alkali-borosilicate glass to a temperature sufficient to separate the glass into two phases only one of which is soluble in an aqueous solution and leaching the soluble phase at a pH of 1.5–7.0 in an aqueous solution containing 0.1–3.0 moles per liter of a water soluble aluminum salt and 0.1–1.0 moles per liter of a water soluble salt of a metal of Group VIII of the Periodic Table selected from the group consisting of iron, cobalt, nickel, palladium and platinum.

9. The method of claim 8, wherein said metal is iron.

10. The method of claim 8, wherein said metal is cobalt.

11. The method of claim 8, wherein said metal is nickel.

References Cited

UNITED STATES PATENTS

| | | | |
|---|---|---|---|
| 2,355,746 | 8/1944 | Nordberg et al. | 65—31 |
| 2,430,432 | 11/1947 | Marisic | 252—477 |
| 2,439,999 | 4/1948 | Adams | 156—24 |
| 2,500,801 | 3/1950 | Church | 252—432 |
| 2,624,658 | 1/1953 | Parker et al. | 65—31 |
| 2,835,637 | 5/1958 | Dowden et al. | 252—432 |
| 3,044,954 | 7/1962 | Hirschler | 252—437 |
| 3,189,563 | 6/1965 | Hauel | 252—477 |

PATRICK P. GARVIN, Primary Examiner

U.S. Cl. X.R.

65—31; 208—114; 260—671, 672, 683.66